United States Patent Office 2,721,131
Patented Oct. 18, 1955

2,721,131

HERBICIDAL COMPOSITION

John C. R. Warren, Elmira, Ontario, Canada, assignor to United States Rubber Company, New York, N. Y., a corporation of New Jersey No Drawing. Application January 21, 1953,
Serial No. 332,562

4 Claims. (Cl. 71—2.6)

This invention relates to herbicidal compositions of matter and more particularly to such compositions of matter in which the active herbicidal ingredient comprises a mixture of isopropyl and isobutyl esters of 2,4,5-trichlorophenoxyacetic acid (hereinafter designated as "2,4,5-T") and which are particularly characterized by their marked resistance to freezing at the low temperatures normally encountered by such formulations during transportation and storage.

A great demand has arisen in the United States and Canada for herbicidal compositions for the killing of weeds and undesirable brush. The demand has been especially great for such compositions in which the active herbicidal ingredient is an alkyl ester of 2,4,5-T. However such ester formulations have presented a very serious problem because of the fact that they solidify at the low atmospheric temperatures encountered in transportation and storage. Most of the ester formulations which have been sold heretofore become solid due to freezing at temperatures well above the freezing point of water. Solidification because of freezing is highly objectionable to the trade for a number of reasons. The freezing and thawing are often thought to injure the formulation. It is usually necessary for the user to take positive steps to thaw the frozen formulation. Thawing is inconvenient and troublesome because of the difficulty of applying the necessary degree of heat to the containers in which the formulation is shipped. Also, it is often necessary to heat the frozen formulation to a temperature much higher than that at which it became frozen in order to convert it to the liquid condition. In addition, the freezing and thawing often cause a stratification of the contents of the container with the result that if the user withdraws a portion only the withdrawn portion has a different composition from the balance of the contents. As a result, it is necessary for the user to bring the entire contents of the vessel to liquid form and then to agitate the contents thoroughly before emptying the container.

The problem is particularly accentuated by the fact that it is customary in the herbicidal art for the manufacturer to ship the formulations to be used in a given growing season during the winter preceding that season so that the formulations are exposed to temperatures well below the freezing point of water and often below —20° C. for long periods of time with the result that if the formulations show any tendency to solidify by freezing they will become solid during such exposure.

As a result, the trade has refused to accept formulations which undergo solidification by freezing at prevailing winter temperatures. Some formulators have actually been forced to withdraw from the alkyl ester type of formulation because of their inability to overcome the freezing problem. Some manufacturers have attempted to overcome the freezing problem by introducing anti-freeze or "coupling" agents such as ethyl alcohol or higher alcohols into their alkyl ester formulations, but such attempts to solve the problem are unsatisfactory because of the expense of such agents and because of the fact that if they are used in addition to normal amounts of other formulating materials they reduce the concentration of active herbicidal material.

The freezing problem is particularly serious with the alkyl esters of 2,4,5-T because these esters solidify at a temperature considerably above that at which the corresponding alkyl esters of 2,4-dichlorophenoxyacetic acid solidify.

The principal object of the present invention is to provide a simple, highly effective and commercially feasible method of securing low freezing points in concentrated herbicidal compositions based upon alkyl esters of 2,4,5-T as the active herbicidal ingredient. Another object is to attain such low freezing points without the introduction of inactive material into the formulation. Another object is to accomplish the foregoing objects without resort to anti-freeze or coupling agents. Another object is to make it possible to prepare highly concentrated formulations, i. e., formulations which are high in active ester of 2,4,5-T and yet which give no difficulty from the standpoint of freezing. Numerous other objects of the present invention will appear to those skilled in the art.

I have discovered that the freezing problem can be overcome in a simple and highly effective manner, without reducing the activity of the formulation, and without introducing extraneous inactive materials into the formulation, by simply employing as the active herbicidal ingredient a mixture, in certain proportions, of the isopropyl and isobutyl esters of 2,4,5-T. Specifically I have discovered that formulations in which the ester component comprises from 20 to 50% by weight of the isopropyl ester of 2,4,5-T and correspondingly from 80 to 50% of the isobutyl ester of 2,4,5-T exhibit unusually high resistance to freezing at the low temperatures encountered in winter in Canada and in the colder parts of the United States.

The above percentages are based on the sum of the isopropyl and isobutyl esters of 2,4,5-T. Mixtures consisting only of the isopropyl and isobutyl esters in the stated proportions do not freeze even when subjected to temperatures as low as 25° C. for prolonged periods of time and their resistance to freezing is greatly enhanced by formulating with suitable amounts of conventional formulating oils. Other esters of 2,4,5-T as well as any esters of 2,4-dichlorophenoxyacetic acid may be used in conjunction with the specific isopropyl-isobutyl 2,4,5-T ester mixtures of my invention.

Following are freezing data for mixtures of isopropyl and isobutyl esters of 2,4,5-T:

| Percent isopropyl ester: | Freezing or clear point, ° C. |
| --- | --- |
| 0 | 32 |
| 20 | 24 |
| 40 | 15.5 |
| 50 | 23.5 |
| 60 | 29.5 |
| 80 | 39 |
| 100 | 46 |

The isopropyl and isobutyl esters of 2,4,5-T used in determining the above data were distilled under reduced pressure to increase their purity after which they were subjected to freezing either alone or in the proportions shown in the table. To induce crystallization all mixtures were seeded with crystals of the separate esters. As the minimum freezing point was approached, by proportioning the two esters, the mixtures were held at below —20° C. and agitated, periodically, if necessary to overcome any tendency to supercool and cause solidification. The temperature was then slowly raised and the mixture was agitated as soon as possible, noting the temperature at which the last crystals disappeared. It will be seen that extremely stringent conditions, far more so than are normally encountered, were employed to cause solidification of mixtures at and near the minimum freezing proportions.

All freezing points given in the above table are actual melting or clear points, i. e., the temperature at which the last crystals disappear after the sample has been caused to solidify as just described and then warmed. All points represent the highest temperature recorded upon melting these particular samples. In many cases, upon repeating these determinations, I obtained lower melting points which probably indicated incomplete crystallization in the composition range of from 20 to 50% of the isopropyl ester. Thus compositions in this range are actually more resistant to freezing than is indicated in the above table which reflects the use of especially severe conditions imposed in the laboratory in inducing freezing and in measuring melting point.

It will be seen that the present invention is distinguished by its simplicity since it is a simple matter for the manufacturer to blend the pre-formed 2,4,5-T esters in the indicated proportions or to esterify 2,4,5-T with a mixture of isopropyl and isobutyl alcohols in the proper proportions to give a blend of the esters in the proportions disclosed herein, having due regard for any difference in the rates of esterification of the two alcohols. The invention makes it possible to prepare ester formulations having a remarkably low freezing point without the complications and expense attendant upon the use of extraneous anti-freeze or coupling agents, etc.

In the practice of my invention I particularly prefer to employ from 30 to 45% of the isopropyl ester and correspondingly from 70 to 55% of the isobutyl ester. Mixtures consisting only of these two esters in these proportions will not freeze at temperatures as low as 20° C. when subjected to the conditions described above.

My invention is particularly advantageous because it enables the formulator to successfully market an ester formulation based upon conventional formulating oils. Essentially paraffinic petroleum hydrocarbon base oils like fuel oil, kerosene, naphtha, Stoddard solvent, etc., can be used but because of the high freezing point of 2,4,5-T esters, compared to corresponding 2,4-D esters, I prefer to employ the more aromatic base oils such as those hydrocarbon base oils which are derived from petroleum or coal tar and which preferably contain at least 25% of aromatic hydrocarbons and still more preferably at least 50% of such hydrocarbons. These oils make it possible to prepare formulations containing high concentrations of the 2,4,5-T esters and having a low freezing point. Purely aromatic hydrocarbons like xylene and toluene are still better.

Generally speaking, hydrocarbon-based formulations made in accordance with my invention will contain from 5 to 65% of hydrocarbon and correspondingly from 95 to 35% of the mixed isopropyl and isobutyl esters, these percentages being by weight based upon the sum of the weights of the hydrocarbon solvent or diluent and the esters. These formulations will not freeze, by the above test, at temperatures as low as 0° C. and usually will not freeze at considerably lower temperatures. In many cases the hydrocarbon solvent or diluent and the esters are the only materials present. However, if desired, any conventional dispersing, emulsifying, wetting or surface active agent or agents can be incorporated in the formulation in any desired proportion. Such agents are often desirable because they aid the operator in converting the concentrated formulation into the desired emulsion in water and because they make possible a more thorough wetting of the foliage or bark with the active herbicidal ingredients.

Such emulsifying, wetting or like agents can be incorporated with the mixed esters by themselves, in the case where no formulating oils are desired.

The amount and type of emulsifying, surface active, or like agent included in the formulation need not be set forth in detail because they are both well within the present skill of the art. In general, however, the amount of such agents will not exceed 10% of the final formulation.

Generally the concentrates made in accordance with my invention will contain at least 30% by weight of the isopropyl and isobutyl esters of 2,4,5-T. More commonly, the concentration of the esters will be at least 50%. The concentration of the esters can range upwardly from these figures to as high as 90 or 95%. In fact the formulation could comprise 100% of the isopropyl and isobutyl esters.

It is readily possible by means of my invention to prepare commercially acceptable concentrates containing a higher 2,4,5-T acid equivalent per gallon than has been possible heretofore.

The formulations of my invention contain such relative proportions of the isopropyl and isobutyl esters of 2,4,5-T that they have a freezing point so far below the freezing points which they would have were they compounded with the isopropyl or the isobutyl ester only that they are commercially acceptable. Actually, as will be seen from the above data, my invention makes possible a lowering of the freezing point from a value of 32° C. for the isobutyl ester by itself or 46° C. for the isopropyl ester by itself to values as low as 15.5° C., these figures referring to mixtures consisting only of the two specified esters. As previously indicated, the freezing points of the mixtures of my invention which have been formulated with a hydrocarbon solvent or diluent are far below the values given for the ester mixtures by themselves.

The following examples represent a typical embodiment of my invention.

*Example I*

| | Percent by weight |
|---|---|
| Isopropyl ester of 2,4,5-T | 19 |
| Isobutyl ester of 2,4,5-T | 28 |
| Petroleum base oil [1] | 47 |
| Emulsifier | 6 |

[1] Aromatic in type. This is a foliage (water-emulsifiable) concentrate.

*Example II*

| | Percent by weight |
|---|---|
| Isopropyl ester of 2,4,5-T | 19 |
| Isobutyl ester of 2,4,5-T | 28 |
| Surface-active agent | 1 |
| Xylene | 52 |

The formulation of Example II was extremely effective for basal bark spraying. The freezing point of this formulation was below —20° C. which is highly desirable because basal bark spraying is usually done in winter.

Although inexpensive petroleum base oil of low aromatic hydrocarbon content can be used, as previously indicated, it is desirable to use a more aromatic oil for added safety in resistance to freezing.

The ester mixtures of my invention are particularly advantageous because they frequently exhibit to a very pronounced extent the phenomenon that they do not freeze when cooled to the temperature indicated as the freezing point in the above table but exhibit extreme supercooling, i. e., remain entirely liquid until cooled far below the point at which they would be expected to become frozen, from a consideration of the data given above. This is highly advantageous and was not to have been anticipated.

In the appended claims the statement that the composition will not freeze at a certain temperature means that it will thaw at not over the stated temperature when it is frozen and thawed in accordance with the laboratory technique described above.

Having thus described my invention, what I claim and desire to protect by Letters Patent is:

1. A low-freezing concentrated herbicidal composition of matter in which the active herbicidal ingredient comprises a mixture of the isopropyl and isobutyl esters of 2,4,5-trichlorophenoxyactic acid in proportions of from 20 to 50% of said isopropyl ester and correspondingly from 80 to 50% of said isobutyl ester, said percentages being by weight based on the sum of said esters.

2. A low-freezing concentrated herbicidal composition of matter in which the active herbicidal ingredient comprises a mixture of the isopropyl and isobutyl esters of 2,4,5-trichlorophenoxyacetic acid in proportions of from 30 to 45% of said isopropyl ester and correspondingly from 70 to 55% of said isobutyl ester, said percentages being by weight based on the sum of said esters.

3. A concentrated herbicidal composition of matter which will not freeze at temperatures as low as 0° C. and which comprises from 5 to 65% of a liquid hydrocarbon and correspondingly from 95 to 35% of a mixture of the isopropyl and isobutyl esters of 2,4,5-trichlorophenoxyacetic acid in proportions of from 20 to 50% of said isopropyl ester and correspondingly from 80 to 50% of said isobutyl ester, said first-named percentages being by weight based on the sum of said hydrocarbon and said mixture and said last-named percentages being by weight based on the sum of said esters.

4. A concentrated herbicidal composition of matter which will not freeze at temperatures as low as 0° C. and which comprises from 5 to 65% of a liquid aromatic hydrocarbon and correspondingly from 95 to 35% of a mixture of the isopropyl and isobutyl esters of 2,4,5-trichlorophenoxyacetic acid in proportions of from 30 to 45% of said isopropyl ester and correspondingly from 70 to 55% of said isobutyl ester, said first-named percentages being by weight based on the sum of said hydrocarbon and said mixture and said last-named percentages being by weight based on the sum of said esters.

References Cited in the file of this patent

UNITED STATES PATENTS

| | | |
|---|---|---|
| 2,543,397 | Allen | Feb. 27, 1951 |
| 2,614,919 | Warren et al. | Oct. 21, 1952 |

OTHER REFERENCES

"Agricultural Chemicals," August 1951, page 36.

"Treatise on Physical Chemistry," by Taylor (Van Nostrand), 2nd edition (1931), vol. I, pages 537 to 542.